US011228647B2

(12) United States Patent
Vijayan et al.

(10) Patent No.: US 11,228,647 B2
(45) Date of Patent: Jan. 18, 2022

(54) SYSTEM AND METHOD FOR SHARING SAN STORAGE

(71) Applicant: Commvault Systems, Inc., Tinton Falls, NJ (US)

(72) Inventors: Manoj Kumar Vijayan, Marlboro, NJ (US); Srikant Viswanathan, Wanowarie (IN); Deepak Raghunath Attarde, Marlboro, NJ (US); Varghese Devassy, Ottawa (CA); Rajiv Kottomtharayil, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 16/789,848

(22) Filed: Feb. 13, 2020

(65) Prior Publication Data

US 2020/0259899 A1 Aug. 13, 2020

Related U.S. Application Data

(60) Continuation of application No. 16/664,298, filed on Oct. 25, 2019, now abandoned, which is a
(Continued)

(51) Int. Cl.
*G06F 3/06* (2006.01)
*G06F 13/42* (2006.01)
*H04L 29/08* (2006.01)

(52) U.S. Cl.
CPC .......... *H04L 67/1097* (2013.01); *G06F 3/061* (2013.01); *G06F 3/064* (2013.01);
(Continued)

(58) Field of Classification Search
CPC .... G06F 3/0604; G06F 3/0605; G06F 3/0607; G06F 3/061–0613; G06F 3/0635;
(Continued)

(56) References Cited

U.S. PATENT DOCUMENTS 4,296,465 A 10/1981 Lemak
4,686,620 A 8/1987 Ng
(Continued)

FOREIGN PATENT DOCUMENTS

EP 0259912 A1 3/1988
EP 0341230 A2 11/1989
(Continued)

OTHER PUBLICATIONS

IBM, "Prioritized Storage in a SAN File System," Apr. 28, 2006, pp. 1-4. (Year: 2006).*
(Continued)

*Primary Examiner* — Michael Krofcheck
(74) *Attorney, Agent, or Firm* — Knobbe, Martens, Olson & Bear, LLP

(57) ABSTRACT

According to various embodiments, systems and methods are provided that relate to shared access to Storage Area Networks (SAN) devices. In one embodiment, a Storage Area Network (SAN) host is provided, comprising: a server component: a first host bus adapter configured to be connected to a SAN client over a first SAN; a second host bus adapter configured to be connected to a SAN storage device over a second SAN; and wherein the server component is configured to manage a data block on the SAN storage device, receive a storage operation request from the SAN client through the first host bus adapter, and in response to the storage operation request, perform a storage operation on the data block, the storage operation being performed over the second SAN through the second host bus adapter.

20 Claims, 6 Drawing Sheets

Related U.S. Application Data continuation of application No. 15/952,024, filed on Apr. 12, 2018, now abandoned, which is a continuation of application No. 15/400,687, filed on Jan. 6, 2017, now abandoned, which is a continuation of application No. 14/929,130, filed on Oct. 30, 2015, now Pat. No. 9,578,101, which is a continuation of application No. 14/675,418, filed on Mar. 31, 2015, now abandoned, which is a division of application No. 13/010,694, filed on Jan. 20, 2011, now Pat. No. 9,021,198.

(52) U.S. Cl.
CPC ............ *G06F 3/067* (2013.01); *G06F 3/0619* (2013.01); *G06F 3/0641* (2013.01); *G06F 3/0659* (2013.01); *G06F 13/426* (2013.01)

(58) Field of Classification Search
CPC ........ G06F 3/067; G06F 3/064; G06F 3/0641; G06F 3/0622; G06F 3/0637; G06F 3/0655; G06F 3/0656; G06F 3/0659; G06F 13/426; G06F 3/0619; H04L 29/08549; H04L 67/1097
See application file for complete search history.

(56) References Cited

U.S. PATENT DOCUMENTS

| | | |
|---|---|---|
| 4,751,639 A | 6/1988 | Corcoran et al. |
| 4,995,035 A | 2/1991 | Cole et al. |
| 5,005,122 A | 4/1991 | Griffin et al. |
| 5,093,912 A | 3/1992 | Dong et al. |
| 5,125,075 A | 6/1992 | Goodale et al. |
| 5,133,065 A | 7/1992 | Cheffetz et al. |
| 5,140,683 A | 8/1992 | Gallo et al. |
| 5,163,048 A | 11/1992 | Heutink |
| 5,163,148 A | 11/1992 | Walls |
| 5,193,154 A | 3/1993 | Kitajima et al. |
| 5,204,958 A | 4/1993 | Cheng et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,251 A | 7/1994 | Urabe et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,387,459 A | 2/1995 | Hung |
| 5,410,700 A | 4/1995 | Fecteau et al. |
| 5,426,284 A | 6/1995 | Doyle |
| 5,448,718 A | 9/1995 | Cohn et al. |
| 5,448,724 A | 9/1995 | Hayashi et al. |
| 5,455,926 A | 10/1995 | Keele et al. |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,564,037 A | 10/1996 | Lam |
| 5,574,898 A | 11/1996 | Leblang et al. |
| 5,598,546 A | 1/1997 | Blomgren |
| 5,608,865 A | 3/1997 | Midgely et al. |
| 5,613,134 A | 3/1997 | Lucus et al. |
| 5,615,392 A | 3/1997 | Harrison et al. |
| 5,619,644 A | 4/1997 | Crockett et al. |
| 5,632,012 A | 5/1997 | Belsan et al. |
| 5,634,052 A | 5/1997 | Morris |
| 5,638,509 A | 6/1997 | Dunphy et al. |
| 5,642,496 A | 6/1997 | Kanfi |
| 5,649,185 A | 7/1997 | Antognini et al. |
| 5,659,614 A | 8/1997 | Bailey |
| 5,666,501 A | 9/1997 | Jones et al. |
| 5,673,381 A | 9/1997 | Huai et al. |
| 5,673,382 A | 9/1997 | Cannon et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,734,817 A | 3/1998 | Roffe et al. |
| 5,737,747 A | 4/1998 | Vishlitsky et al. |
| 5,740,405 A | 4/1998 | DeGraaf |
| 5,742,807 A | 4/1998 | Masinter |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,761,734 A | 6/1998 | Pfeffer et al. |
| 5,764,972 A | 6/1998 | Crouse et al. |
| 5,778,165 A | 7/1998 | Saxon |
| 5,778,395 A | 7/1998 | Whiting et al. |
| 5,790,828 A | 8/1998 | Jost |
| 5,793,867 A | 8/1998 | Cordery |
| 5,805,920 A | 9/1998 | Sprenkle et al. |
| 5,806,058 A | 9/1998 | Mori et al. |
| 5,806,078 A | 9/1998 | Hug et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,045 A | 10/1998 | Motoyama |
| 5,829,046 A | 10/1998 | Tzelnic et al. |
| 5,832,522 A | 11/1998 | Blickenstaff et al. |
| 5,835,953 A | 11/1998 | Ohran |
| 5,845,257 A | 12/1998 | Fu et al. |
| 5,860,073 A | 1/1999 | Ferrel et al. |
| 5,860,104 A | 1/1999 | Witt et al. |
| 5,864,846 A | 1/1999 | Voorhees et al. |
| 5,864,871 A | 1/1999 | Kitain et al. |
| 5,875,478 A | 2/1999 | Blumenau |
| 5,875,481 A | 2/1999 | Ashton et al. |
| 5,878,230 A | 3/1999 | Weber et al. |
| 5,881,311 A | 3/1999 | Woods |
| 5,884,067 A | 3/1999 | Storm et al. |
| 5,887,134 A | 3/1999 | Ebrahim |
| 5,893,139 A | 4/1999 | Kamiyama |
| 5,896,531 A | 4/1999 | Curtis et al. |
| 5,897,642 A | 4/1999 | Capossela et al. |
| 5,898,431 A | 4/1999 | Webster et al. |
| 5,901,327 A | 5/1999 | Ofek |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,956,733 A | 9/1999 | Nakano et al. |
| 5,958,005 A | 9/1999 | Thorne et al. |
| 5,966,730 A | 10/1999 | Zulch |
| 5,970,030 A | 10/1999 | Dimitri et al. |
| 5,970,233 A | 10/1999 | Liu et al. |
| 5,970,255 A | 10/1999 | Tran et al. |
| 5,974,563 A | 10/1999 | Beeler, Jr. |
| 5,978,841 A | 11/1999 | Berger |
| 5,983,239 A | 11/1999 | Cannon |

(56) References Cited

U.S. PATENT DOCUMENTS

| | | |
|---|---|---|
| 5,983,368 A | 11/1999 | Noddings |
| 5,987,478 A | 11/1999 | See et al. |
| 5,991,753 A | 11/1999 | Wilde |
| 5,995,091 A | 11/1999 | Near et al. |
| 6,000,020 A | 12/1999 | Chin et al. |
| 6,003,089 A | 12/1999 | Shaffer et al. |
| 6,009,274 A | 12/1999 | Fletcher et al. |
| 6,012,053 A | 1/2000 | Pant et al. |
| 6,012,090 A | 1/2000 | Chung et al. |
| 6,012,415 A | 1/2000 | Linseth |
| 6,016,553 A | 1/2000 | Schneider et al. |
| 6,018,744 A | 1/2000 | Mamiya et al. |
| 6,021,415 A | 2/2000 | Cannon et al. |
| 6,023,710 A | 2/2000 | Steiner et al. |
| 6,026,414 A | 2/2000 | Anglin |
| 6,026,437 A | 2/2000 | Muschett et al. |
| 6,052,735 A | 4/2000 | Ulrich et al. |
| 6,061,671 A | 5/2000 | Baker et al. |
| 6,064,821 A | 5/2000 | Shough et al. |
| 6,070,228 A | 5/2000 | Belknap et al. |
| 6,073,128 A | 6/2000 | Pongracz et al. |
| 6,073,137 A | 6/2000 | Brown et al. |
| 6,073,220 A | 6/2000 | Gunderson |
| 6,076,148 A | 6/2000 | Kedem et al. |
| 6,078,934 A | 6/2000 | Lahey et al. |
| 6,081,883 A | 6/2000 | Popelka et al. |
| 6,085,030 A | 7/2000 | Whitehead et al. |
| 6,088,694 A | 7/2000 | Burns et al. |
| 6,091,518 A | 7/2000 | Anabuki |
| 6,094,416 A | 7/2000 | Ying |
| 6,101,585 A | 8/2000 | Brown et al. |
| 6,105,037 A | 8/2000 | Kishi |
| 6,105,129 A | 8/2000 | Meier et al. |
| 6,108,640 A | 8/2000 | Slotznick |
| 6,108,712 A | 8/2000 | Hayes, Jr. |
| 6,112,239 A | 8/2000 | Kenner et al. |
| 6,122,668 A | 9/2000 | Teng et al. |
| 6,131,095 A | 10/2000 | Low et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,151,590 A | 11/2000 | Cordery et al. |
| 6,154,787 A | 11/2000 | Urevig et al. |
| 6,154,852 A | 11/2000 | Amundson et al. |
| 6,161,111 A | 12/2000 | Mutalik et al. |
| 6,161,192 A | 12/2000 | Lubbers et al. |
| 6,167,402 A | 12/2000 | Yeager |
| 6,175,829 B1 | 1/2001 | Li et al. |
| 6,182,198 B1 | 1/2001 | Hubis et al. |
| 6,189,051 B1 | 2/2001 | Oh et al. |
| 6,212,512 B1 | 4/2001 | Barney et al. |
| 6,212,521 B1 | 4/2001 | Minami et al. |
| 6,223,269 B1 | 4/2001 | Blumenau |
| 6,226,759 B1 | 5/2001 | Miller et al. |
| 6,230,164 B1 | 5/2001 | Rikieta et al. |
| 6,249,795 B1 | 6/2001 | Douglis |
| 6,253,217 B1 | 6/2001 | Dourish et al. |
| 6,260,069 B1 | 7/2001 | Anglin |
| 6,263,368 B1 | 7/2001 | Martin |
| 6,266,679 B1 | 7/2001 | Szalwinski et al. |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar |
| 6,298,439 B1 | 10/2001 | Beglin |
| 6,301,592 B1 | 10/2001 | Aoyama et al. |
| 6,304,880 B1 | 10/2001 | Kishi |
| 6,314,439 B1 | 11/2001 | Bates et al. |
| 6,314,460 B1 | 11/2001 | Knight et al. |
| 6,324,581 B1 | 11/2001 | Xu et al. |
| 6,327,590 B1 | 12/2001 | Chidlovskii et al. |
| 6,327,612 B1 | 12/2001 | Watanabe |
| 6,328,766 B1 | 12/2001 | Long |
| 6,330,570 B1 | 12/2001 | Crighton |
| 6,330,572 B1 | 12/2001 | Sitka |
| 6,330,589 B1 | 12/2001 | Kennedy |
| 6,330,642 B1 | 12/2001 | Carteau |
| 6,341,287 B1 | 1/2002 | Sziklai et al. |
| 6,343,287 B1 | 1/2002 | Kumar et al. |
| 6,343,324 B1 | 1/2002 | Hubis et al. |
| 6,345,288 B1 | 2/2002 | Reed et al. |
| 6,350,199 B1 | 2/2002 | Williams et al. |
| 6,351,763 B1 | 2/2002 | Kawanaka |
| 6,351,764 B1 | 2/2002 | Voticky et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,863 B1 | 3/2002 | Sayle |
| 6,360,306 B1 | 3/2002 | Bergsten |
| 6,363,462 B1 | 3/2002 | Bergsten |
| 6,367,029 B1 | 4/2002 | Mayhead et al. |
| 6,367,073 B2 | 4/2002 | Elledge |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,389,459 B1 | 5/2002 | McDowell |
| 6,396,513 B1 | 5/2002 | Helfman et al. |
| 6,397,308 B1 | 5/2002 | Ofek et al. |
| 6,418,478 B1 | 7/2002 | Ignatius et al. |
| 6,421,709 B1 | 7/2002 | McCormick et al. |
| 6,421,711 B1 | 7/2002 | Blumenau et al. |
| 6,438,595 B1 | 8/2002 | Blumenau et al. |
| 6,442,600 B1 | 8/2002 | Anderson |
| 6,442,706 B1 | 8/2002 | Wahl et al. |
| 6,453,325 B1 | 9/2002 | Cabrera et al. |
| 6,466,592 B1 | 10/2002 | Chapman |
| 6,466,973 B2 | 10/2002 | Jaffe |
| 6,470,332 B1 | 10/2002 | Weschler |
| 6,473,794 B1 | 10/2002 | Guheen et al. |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,493,811 B1 | 12/2002 | Blades et al. |
| 6,502,205 B1 | 12/2002 | Yanai et al. |
| 6,519,679 B2 | 2/2003 | Devireddy et al. |
| 6,535,910 B1 | 3/2003 | Suzuki et al. |
| 6,538,669 B1 | 3/2003 | Lagueux, Jr. et al. |
| 6,540,623 B2 | 4/2003 | Jackson |
| 6,542,909 B1 | 4/2003 | Tamer et al. |
| 6,542,972 B2 | 4/2003 | Ignatius et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,581,143 B2 | 6/2003 | Gagne et al. |
| 6,593,656 B2 | 7/2003 | Ahn et al. |
| 6,604,149 B1 | 8/2003 | Deo et al. |
| 6,615,241 B1 | 9/2003 | Miller et al. |
| 6,618,771 B1 | 9/2003 | Leja et al. |
| 6,629,110 B2 | 9/2003 | Cane et al. |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,399 B2 | 11/2003 | Zaremba |
| 6,647,409 B1 | 11/2003 | Sherman et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,675,177 B1 | 1/2004 | Webb |
| 6,704,933 B1 | 3/2004 | Tanaka et al. |
| 6,721,767 B2 | 4/2004 | De Meno et al. |
| 6,721,784 B1 | 4/2004 | Leonard et al. |
| 6,728,733 B2 | 4/2004 | Tokui |
| 6,732,088 B1 | 5/2004 | Glance |
| 6,732,124 B1 | 5/2004 | Koseki et al. |
| 6,732,231 B1 | 5/2004 | Don et al. |
| 6,732,244 B2 | 5/2004 | Ashton et al. |
| 6,742,092 B1 | 5/2004 | Huebsch et al. |
| 6,745,178 B1 | 6/2004 | Emens et al. |

(56) References Cited

U.S. PATENT DOCUMENTS

| | | |
|---|---|---|
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski et al. |
| 6,860,422 B2 | 3/2005 | Hull et al. |
| 6,865,568 B2 | 3/2005 | Chau |
| 6,868,424 B2 | 3/2005 | Jones et al. |
| 6,871,163 B2 | 3/2005 | Hiller et al. |
| 6,871,182 B1 | 3/2005 | Winnard et al. |
| 6,874,023 B1 | 3/2005 | Pennell et al. |
| 6,886,020 B1 | 4/2005 | Zahavi et al. |
| 6,892,221 B2 | 5/2005 | Ricart et al. |
| 6,912,627 B2 | 6/2005 | Matsunami et al. |
| 6,912,645 B2 | 6/2005 | Dorward et al. |
| 6,941,304 B2 | 9/2005 | Gainey et al. |
| 6,948,038 B2 | 9/2005 | Berkowitz et al. |
| 6,952,758 B2 | 10/2005 | Chron et al. |
| 6,957,186 B1 | 10/2005 | Guheen et al. |
| 6,968,351 B2 | 11/2005 | Butterworth |
| 6,970,997 B2 | 11/2005 | Shibayama et al. |
| 6,973,553 B1 | 12/2005 | Archibald, Jr. et al. |
| 6,976,039 B2 | 12/2005 | Chefalas et al. |
| 6,978,265 B2 | 12/2005 | Schumacher |
| 6,983,351 B2 | 1/2006 | Gibble et al. |
| 6,995,675 B2 | 2/2006 | Curkendall et al. |
| 6,996,616 B1 | 2/2006 | Leighton et al. |
| 7,003,519 B1 | 2/2006 | Biettron et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad |
| 7,058,661 B2 | 6/2006 | Ciaramitaro et al. |
| 7,062,761 B2 | 6/2006 | Slavin et al. |
| 7,076,685 B2 | 7/2006 | Pillai et al. |
| 7,082,441 B1 | 7/2006 | Zahavi et al. |
| 7,085,904 B2 | 8/2006 | Mizuno et al. |
| 7,096,315 B2 | 8/2006 | Takeda et al. |
| 7,099,901 B2 | 8/2006 | Sutoh et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,107,416 B2 | 9/2006 | Stuart et al. |
| 7,120,757 B2 | 10/2006 | Tsuge |
| 7,130,970 B2 | 10/2006 | Devassy et al. |
| 7,133,870 B1 | 11/2006 | Tripp et al. |
| 7,134,041 B2 | 11/2006 | Murray et al. |
| 7,139,826 B2 | 11/2006 | Watanabe et al. |
| 7,146,387 B1 | 12/2006 | Russo et al. |
| 7,149,893 B1 | 12/2006 | Leonard et al. |
| 7,155,421 B1 | 12/2006 | Haidar |
| 7,155,465 B2 | 12/2006 | Lee et al. |
| 7,155,481 B2 | 12/2006 | Prahlad et al. |
| 7,155,633 B2 | 12/2006 | Tuma et al. |
| 7,159,081 B2 | 1/2007 | Suzuki |
| 7,171,468 B2 | 1/2007 | Yeung et al. |
| 7,171,585 B2 | 1/2007 | Gail et al. |
| 7,174,312 B2 | 2/2007 | Harper et al. |
| 7,188,141 B2 | 3/2007 | Novaes |
| 7,194,454 B2 | 3/2007 | Hansen et al. |
| 7,240,100 B1 | 7/2007 | Wein et al. |
| 7,246,140 B2 | 7/2007 | Therrien et al. |
| 7,246,207 B2 | 7/2007 | Kottomtharayil et al. |
| 7,269,612 B2 | 9/2007 | Devarakonda et al. |
| 7,269,664 B2 | 9/2007 | Hütsch et al. |
| 7,272,606 B2 | 9/2007 | Borthakur et al. |
| 7,278,142 B2 | 10/2007 | Bandhole et al. |
| 7,287,047 B2 | 10/2007 | Kavuri |
| 7,290,017 B1 | 10/2007 | Wang et al. |
| 7,293,133 B1 | 11/2007 | Colgrove et al. |
| 7,313,659 B2 | 12/2007 | Suzuki |
| 7,315,923 B2 | 1/2008 | Retnamma et al. |
| 7,315,924 B2 | 1/2008 | Prahlad et al. |
| 7,325,017 B2 | 1/2008 | Tormasov et al. |
| 7,328,225 B1 | 2/2008 | Beloussov et al. |
| 7,328,325 B1 | 2/2008 | Solis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,676 B1 | 3/2008 | Swildens et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,376,947 B2 | 5/2008 | Evers |
| 7,379,978 B2 | 5/2008 | Anderson et al. |
| 7,380,072 B2 | 5/2008 | Kottomtharayil et al. |
| 7,386,535 B1 | 6/2008 | Kalucha et al. |
| 7,386,552 B2 | 6/2008 | Kitamura et al. |
| 7,389,311 B1 | 6/2008 | Crescenti et al. |
| 7,395,282 B1 | 7/2008 | Crescenti et al. |
| 7,401,338 B1 * | 7/2008 | Bowen ............... H04L 41/5035 709/200 |
| 7,409,509 B2 | 8/2008 | Devassy et al. |
| 7,424,543 B2 | 9/2008 | Rice, III |
| 7,430,587 B2 | 9/2008 | Malone et al. |
| 7,433,301 B2 | 10/2008 | Akahane et al. |
| 7,434,219 B2 | 10/2008 | De Meno et al. |
| 7,437,445 B1 | 10/2008 | Roytman et al. |
| 7,447,692 B2 | 11/2008 | Oshinsky et al. |
| 7,454,569 B2 | 11/2008 | Kavuri et al. |
| 7,457,790 B2 | 11/2008 | Kochunni et al. |
| 7,467,167 B2 | 12/2008 | Patterson |
| 7,472,142 B2 | 12/2008 | Prahlad et al. |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,841 B2 | 2/2009 | Hadfield et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,519,726 B2 | 4/2009 | Palliyll et al. |
| 7,523,483 B2 | 4/2009 | Dogan |
| 7,529,748 B2 | 5/2009 | Wen et al. |
| 7,532,340 B2 | 5/2009 | Koppich et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,565,484 B2 | 7/2009 | Ghosal et al. |
| 7,577,689 B1 | 8/2009 | Masinter et al. |
| 7,577,694 B2 | 8/2009 | Nakano et al. |
| 7,581,077 B2 | 8/2009 | Ignatius et al. |
| 7,584,469 B2 | 9/2009 | Mitekura et al. |
| 7,587,715 B1 | 9/2009 | Barrett et al. |
| 7,593,935 B2 | 9/2009 | Sullivan |
| 7,596,586 B2 | 9/2009 | Gokhale et al. |
| 7,596,713 B2 | 9/2009 | Mani-Meitav |
| 7,603,626 B2 | 10/2009 | Williams et al. |
| 7,606,844 B2 | 10/2009 | Kottomtharayil |
| 7,610,285 B1 | 10/2009 | Zoellner et al. |
| 7,613,748 B2 | 11/2009 | Brockway et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,668,884 B2 | 2/2010 | Prahlad et al. |
| 7,673,175 B2 | 3/2010 | Mora et al. |
| 7,676,542 B2 | 3/2010 | Moser et al. |
| 7,685,126 B2 | 3/2010 | Patel et al. |
| 7,689,899 B2 | 3/2010 | Leymaster et al. |

(56) References Cited

U.S. PATENT DOCUMENTS

| | | |
|---|---|---|
| 7,716,171 B2 | 5/2010 | Kryger |
| 7,730,031 B2 | 6/2010 | Forster |
| 7,734,593 B2 | 6/2010 | Prahlad et al. |
| 7,734,669 B2 | 6/2010 | Kottomtharayil et al. |
| 7,734,715 B2 | 6/2010 | Hyakutake et al. |
| 7,751,628 B1 | 7/2010 | Reisman |
| 7,757,043 B2 | 7/2010 | Kavuri et al. |
| 7,792,789 B2 | 9/2010 | Prahlad et al. |
| 7,801,871 B2 | 9/2010 | Gosnell |
| 7,802,067 B2 | 9/2010 | Prahlad et al. |
| 7,814,118 B2 | 10/2010 | Kottomtharayil et al. |
| 7,827,266 B2 | 11/2010 | Gupta |
| 7,831,793 B2 | 11/2010 | Chakravarty et al. |
| 7,840,537 B2 | 11/2010 | Gokhale et al. |
| 7,844,676 B2 | 11/2010 | Prahlad et al. |
| 7,865,517 B2 | 1/2011 | Prahlad et al. |
| 7,870,355 B2 | 1/2011 | Erofeev |
| 7,873,808 B2 | 1/2011 | Stewart |
| 7,877,351 B2 | 1/2011 | Crescenti et al. |
| 7,882,077 B2 | 2/2011 | Gokhale et al. |
| 7,882,093 B2 | 2/2011 | Kottomtharayil et al. |
| 7,890,718 B2 | 2/2011 | Gokhale |
| 7,890,719 B2 | 2/2011 | Gokhale |
| 7,930,481 B1 | 4/2011 | Nagler et al. |
| 7,937,393 B2 | 5/2011 | Prahlad et al. |
| 7,937,420 B2 | 5/2011 | Tabellion et al. |
| 7,937,702 B2 | 5/2011 | De Meno et al. |
| 7,962,455 B2 | 6/2011 | Erofeev |
| 7,984,063 B2 | 7/2011 | Kottomtharayil et al. |
| 8,037,028 B2 | 10/2011 | Prahlad et al. |
| 8,041,673 B2 | 10/2011 | Crescenti et al. |
| 8,046,331 B1 | 10/2011 | Sanghavi et al. |
| 8,055,627 B2 | 11/2011 | Prahlad et al. |
| 8,060,514 B2 | 11/2011 | Arrouye et al. |
| 8,078,583 B2 | 12/2011 | Prahlad et al. |
| 8,086,809 B2 | 12/2011 | Prahlad et al. |
| 8,103,670 B2 | 1/2012 | Oshinsky et al. |
| 8,103,829 B2 | 1/2012 | Kavuri et al. |
| 8,121,983 B2 | 2/2012 | Prahlad et al. |
| 8,166,263 B2 | 4/2012 | Prahlad |
| 8,204,859 B2 | 6/2012 | Ngo |
| 8,214,444 B2 | 7/2012 | Prahlad et al. |
| 8,219,524 B2 | 7/2012 | Gokhale |
| 8,266,106 B2 | 9/2012 | Prahlad et al. |
| 8,266,397 B2 | 9/2012 | Prahlad et al. |
| 8,271,830 B2 | 9/2012 | Erofeev |
| 8,352,422 B2 | 1/2013 | Prahlad et al. |
| 8,352,433 B2 | 1/2013 | Crescenti et al. |
| 8,402,219 B2 | 3/2013 | Kavuri et al. |
| 8,433,679 B2 | 4/2013 | Crescenti et al. |
| 8,504,634 B2 | 8/2013 | Prahlad et al. |
| 8,566,278 B2 | 10/2013 | Crescenti et al. |
| 8,577,844 B2 | 11/2013 | Prahlad et al. |
| 8,725,731 B2 | 5/2014 | Oshinsky et al. |
| 8,725,964 B2 | 5/2014 | Prahlad et al. |
| 8,782,064 B2 | 7/2014 | Kottomtharayil |
| 8,930,319 B2 | 1/2015 | Crescenti et al. |
| 9,003,117 B2 | 4/2015 | Kavuri et al. |
| 9,003,137 B2 | 4/2015 | Prahlad et al. |
| 9,021,198 B1 | 4/2015 | Vijayan et al. |
| 9,104,340 B2 | 8/2015 | Prahlad et al. |
| 9,274,803 B2 | 3/2016 | De Meno et al. |
| 9,286,398 B2 | 3/2016 | Oshinsky et al. |
| 9,578,101 B2 | 2/2017 | Vijayan et al. |
| 2002/0004883 A1 | 1/2002 | Nguyen et al. |
| 2002/0032878 A1 | 3/2002 | Karpf |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049778 A1 | 4/2002 | Bell et al. |
| 2002/0049883 A1 | 4/2002 | Schneider et al. |
| 2002/0069324 A1 | 6/2002 | Gerasimov et al. |
| 2002/0099690 A1 | 7/2002 | Schumacher |
| 2002/0103848 A1 | 8/2002 | Giacomini et al. |
| 2002/0107877 A1 | 8/2002 | Whiting et al. |
| 2002/0120858 A1 | 8/2002 | Porter et al. |
| 2002/0161753 A1 | 10/2002 | Inaba et al. |
| 2002/0161982 A1 | 10/2002 | Riedel |
| 2002/0196744 A1 | 12/2002 | O'Connor |
| 2003/0046313 A1 | 3/2003 | Leung et al. |
| 2003/0050979 A1 | 3/2003 | Takahashi |
| 2003/0055972 A1 | 3/2003 | Fuller et al. |
| 2003/0061491 A1 | 3/2003 | Jaskiewicz et al. |
| 2003/0097361 A1 | 5/2003 | Huang et al. |
| 2003/0101086 A1 | 5/2003 | San Miguel |
| 2003/0163399 A1 | 8/2003 | Harper et al. |
| 2003/0172158 A1 | 9/2003 | Pillai et al. |
| 2003/0204572 A1 | 10/2003 | Mannen et al. |
| 2003/0212752 A1 | 11/2003 | Thunquest et al. |
| 2004/0039689 A1 | 2/2004 | Penney et al. |
| 2004/0107199 A1 | 6/2004 | Dalrymple et al. |
| 2004/0122938 A1 | 6/2004 | Messick et al. |
| 2004/0133915 A1 | 7/2004 | Moody, II et al. |
| 2004/0181476 A1* | 9/2004 | Smith ............... H04L 67/1097 705/35 |
| 2004/0193953 A1 | 9/2004 | Callahan et al. |
| 2004/0205206 A1 | 10/2004 | Naik et al. |
| 2004/0215749 A1* | 10/2004 | Tsao ............... H04L 41/12 709/220 |
| 2004/0230829 A1 | 11/2004 | Dogan et al. |
| 2004/0236868 A1 | 11/2004 | Martin et al. |
| 2004/0250026 A1* | 12/2004 | Tanoue ............... G06F 3/0689 711/151 |
| 2004/0267815 A1 | 12/2004 | De Mes |
| 2005/0033800 A1 | 2/2005 | Kavuri et al. |
| 2005/0039069 A1 | 2/2005 | Prahlad et al. |
| 2005/0044114 A1 | 2/2005 | Kottomtharayil et al. |
| 2005/0097070 A1 | 5/2005 | Enis et al. |
| 2005/0146510 A1 | 7/2005 | Ostergard |
| 2005/0246510 A1 | 11/2005 | Retnamma et al. |
| 2005/0251635 A1 | 11/2005 | Yoshinari et al. |
| 2005/0251786 A1 | 11/2005 | Citron et al. |
| 2005/0268068 A1 | 12/2005 | Ignatius et al. |
| 2005/0278207 A1 | 12/2005 | Ronnewinkel |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2006/0282900 A1 | 12/2006 | Johnson et al. |
| 2007/0022145 A1 | 1/2007 | Kavuri |
| 2007/0028229 A1 | 2/2007 | Knatcher |
| 2007/0043715 A1 | 2/2007 | Kaushik et al. |
| 2007/0043956 A1 | 2/2007 | El Far et al. |
| 2007/0061266 A1 | 3/2007 | Moore et al. |
| 2007/0061298 A1 | 3/2007 | Wilson et al. |
| 2007/0078913 A1 | 4/2007 | Crescenti et al. |
| 2007/0100867 A1 | 5/2007 | Celik et al. |
| 2007/0143756 A1 | 6/2007 | Gokhale |
| 2007/0166674 A1 | 7/2007 | Kochunni et al. |
| 2007/0174536 A1 | 7/2007 | Nakagawa et al. |
| 2007/0183224 A1 | 8/2007 | Erofeev |
| 2007/0250810 A1 | 10/2007 | Tittizer et al. |
| 2007/0288536 A1 | 12/2007 | Sen et al. |
| 2007/0296258 A1 | 12/2007 | Calvert et al. |
| 2008/0028164 A1 | 1/2008 | Ikemoto et al. |
| 2008/0059515 A1 | 3/2008 | Fulton |
| 2008/0229037 A1 | 9/2008 | Bunte et al. |
| 2008/0243855 A1 | 10/2008 | Prahlad et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0083484 A1 | 3/2009 | Basham et al. |
| 2009/0150608 A1* | 6/2009 | Innan ............... G06F 3/067 711/113 |

(56) References Cited

U.S. PATENT DOCUMENTS

| | | | |
|---|---|---|---|
| 2009/0171883 A1 | 7/2009 | Kochunni et al. | |
| 2009/0177719 A1 | 7/2009 | Kavuri | |
| 2009/0228894 A1 | 9/2009 | Gokhale | |
| 2009/0248762 A1 | 10/2009 | Prahlad et al. | |
| 2009/0271791 A1 | 10/2009 | Gokhale | |
| 2009/0319534 A1 | 12/2009 | Gokhale | |
| 2009/0319585 A1 | 12/2009 | Gokhale | |
| 2009/0320029 A1 | 12/2009 | Kottomtharayil | |
| 2009/0320033 A1 | 12/2009 | Gokhale et al. | |
| 2009/0320037 A1 | 12/2009 | Gokhale et al. | |
| 2010/0031017 A1 | 2/2010 | Gokhale et al. | |
| 2010/0049753 A1 | 2/2010 | Prahlad et al. | |
| 2010/0070466 A1 | 3/2010 | Prahlad et al. | |
| 2010/0070474 A1 | 3/2010 | Lad | |
| 2010/0070725 A1 | 3/2010 | Prahlad et al. | |
| 2010/0070726 A1 | 3/2010 | Ngo et al. | |
| 2010/0076932 A1 | 3/2010 | Lad | |
| 2010/0094808 A1 | 4/2010 | Erofeev | |
| 2010/0100529 A1 | 4/2010 | Erofeev | |
| 2010/0114837 A1 | 5/2010 | Prahlad et al. | |
| 2010/0122053 A1 | 5/2010 | Prahlad et al. | |
| 2010/0131461 A1 | 5/2010 | Prahlad et al. | |
| 2010/0145909 A1 | 6/2010 | Ngo | |
| 2010/0179941 A1 | 7/2010 | Agrawal et al. | |
| 2010/0205150 A1 | 8/2010 | Prahlad et al. | |
| 2011/0066817 A1 | 3/2011 | Kavuri et al. | |
| 2011/0072097 A1 | 3/2011 | Prahlad et al. | |
| 2011/0093471 A1 | 4/2011 | Brockway et al. | |
| 2011/0173207 A1 | 7/2011 | Kottomtharayil et al. | |
| 2011/0261686 A1* | 10/2011 | Kotha | H04L 47/266 370/230 |
| 2012/0059797 A1 | 3/2012 | Prahlad et al. | |
| 2012/0059800 A1* | 3/2012 | Guo | G06F 16/1727 707/664 |
| 2012/0089800 A1 | 4/2012 | Prahlad et al. | |
| 2012/0124042 A1 | 5/2012 | Oshinsky et al. | |
| 2012/0166582 A1 | 6/2012 | Binder | |
| 2013/0326178 A1 | 12/2013 | Crescenti et al. | |
| 2015/0207883 A1 | 7/2015 | Vijayan et al. | |
| 2015/0378611 A1 | 12/2015 | Prahlad et al. | |
| 2016/0085468 A1 | 3/2016 | Cresenti et al. | |
| 2017/0118289 A1 | 4/2017 | Vijayan et al. | |
| 2018/0018099 A1 | 1/2018 | Prahlad et al. | |
| 2018/0337995 A1 | 11/2018 | Vijayan et al. | |
| 2020/0278792 A1 | 9/2020 | Prahlad et al. | |

FOREIGN PATENT DOCUMENTS

| | | |
|---|---|---|
| EP | 0381651 A2 | 8/1990 |
| EP | 0405926 A1 | 1/1991 |
| EP | 0467546 A2 | 1/1992 |
| EP | 0599466 A1 | 6/1994 |
| EP | 0670543 A1 | 9/1995 |
| EP | 0717346 A2 | 6/1996 |
| EP | 0774715 A1 | 5/1997 |
| EP | 0809184 A1 | 11/1997 |
| EP | 0862304 A2 | 9/1998 |
| EP | 0899662 A1 | 3/1999 |
| EP | 0910019 A2 | 4/1999 |
| EP | 0981090 A1 | 2/2000 |
| EP | 0 986 011 A2 | 3/2000 |
| EP | 0986011 A2 | 3/2000 |
| EP | 1035690 A2 | 9/2000 |
| EP | 1174795 A1 | 1/2002 |
| GB | 2216368 A | 10/1989 |
| HK | 1064178 A1 | 8/2013 |
| JP | 07-046271 | 2/1995 |
| JP | 07-073080 | 3/1995 |
| JP | 08-044598 | 2/1996 |
| JP | H11-102314 | 4/1999 |
| JP | H11-259459 | 9/1999 |
| JP | 2000-035969 | 2/2000 |
| JP | 2001-60175 | 3/2001 |
| JP | 2003-531435 | 10/2003 |
| WO | WO 94/17474 A1 | 8/1994 |
| WO | WO 95/13580 A1 | 5/1995 |
| WO | WO 98/39707 A1 | 9/1998 |
| WO | WO 99/12098 A1 | 3/1999 |
| WO | WO 99/14692 A1 | 3/1999 |
| WO | WO 99/23585 A1 | 5/1999 |
| WO | WO 00/58865 A1 | 10/2000 |
| WO | WO 01/04756 A1 | 1/2001 |
| WO | WO 01/06368 A1 | 1/2001 |
| WO | WO 01/16693 A2 | 3/2001 |
| WO | WO 01/80005 | 10/2001 |
| WO | WO 05/050381 A2 | 6/2005 |

OTHER PUBLICATIONS

U.S. Appl. No. 13/038,614, filed Sep. 26, 2013, Prahlad, et al..
U.S. Appl. No. 13/787,583, filed Mar. 6, 2013, Kavuri, et al.
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009, www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Catapult, Inc., Microsoft Outlook 2000 Step by Step, Published May 7, 1999, "Collaborating with Others Using Outlook & Exchange", p. 8 including "Message Timeline."
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
http://en.wikipedia.org/wiki/Naive_Bayes_classifier, printed on Jun. 1, 2010, in 7 pages.
Hsiao, et al., "Using a Multiple Storage Quad Tree on a Hierarchal VLSI Compaction Scheme", IEEE, 1990, pp. 1-15.
Jander, "Launching Storage-Area Net," Data Communications, US, McGraw Hill, NY, vol. 27, No. 4(Mar. 21, 1998), pp. 64-72.
Microsoft, about using Microsoft Excel 2000 files with earlier version Excel, 1985-1999, Microsoft, p. 1.
Microsoft Press Computer Dictionary Third Edition, "Data Compression," Microsoft Press, 1997, p. 130.
Pitoura al., "Locating Objects in Mobile Computing", IEEE Transactions on Knowledge and Data Engineering, vol. 13, No. 4, Jul.-Aug. 2001, pp. 571-592.
Rosenblum et al., "The Design and Implementation of a Log-Structure File System," Operating Systems Review SIGOPS, vol. 25, No. 5, New York, US, pp. 1-15 (May 1991).
Rowe et al., "Indexes for User Access to Large Video Databases", Storage and Retrieval for Image and Video Databases II, IS,& T/SPIE Symp. On Elec. Imaging Sci. & Tech., Feb. 1994, pp. 1-12.
Swift et al., "Improving the Reliability of Commodity Operating Systems" ACM 2003.
Szor, The Art of Virus Research and Defense, Symantec Press (2005) ISBN 0-321-30454-3, Part 1.
Szor, The Art of Virus Research and Defense, Symantec Press (2005) ISBN 0-321-30454-3, Part 2.
Toyoda, Fundamentals of Oracle 8i Backup and Recovery, DB Magazine, Japan, Shoeisha, Co., Ltd.; Jul. 2000; vol. 10, No. 4, 34 total pages.
Veeravalli, B., "Network Caching Strategies for a Shared Data Distribution for a Predefined Service Demand Sequence," IEEE Transactions on Knowledge and Data Engineering, vol. 15, No. 6, Nov.-Dec. 2003, pp. 1487-1497.

(56) References Cited

OTHER PUBLICATIONS

Weatherspoon H. et al., "Silverback: A Global-Scale Archival System," Mar. 2001, pp. 1-15.
Witten et al., Data Mining: Practical Machine Learning Tools and Techniques, Ian H. Witten & Eibe Frank, Elsevier (2005) ISBN 0-12-088407-0, Part 1.
Witten et al., Data Mining: Practical Machine Learning Tools and Techniques, Ian H. Witten & Eibe Frank, Elsevier (2005) ISBN 0-12-088407-0, Part 2.
Supplementary European Search Report, European Patent Application No. 02747883, dated Sep. 15, 2006; 2 pages.
Communication in European Application No. 02 747 883.3, dated Jul. 20, 2007).
Japanese Office Action dated Jul. 15, 2008, Application No. 2003/502696.
International Search Report dated Aug. 22, 2002, PCT/US2002/017973.
International Search Report dated Dec. 23, 2003, PCT/US2001/003088.
European Examination Report, Application No. 01906806.3-1244, dated Sep. 13, 2006, 3 pages.
European Communication, Application No. 01906806.3, dated Sep. 21, 2010, 6 pages.
Office Action in European Application No. 02747883.3 dated Jul. 7, 2014.
International Search Report and Preliminary Report on Patentability dated Feb. 21, 2002, PCT/US2001/003183.
European Office Action dated Mar. 26, 2008, EP019068337.
International Search Report and Preliminary Report on Patentability dated Sep. 29, 2001, PCT/US2001/003209.
International Search Report and Preliminary Report on Patentability dated Mar. 3, 2003, PCT/US2002/018169.
Supplementary European Search Report dated Sep. 21, 2006, EP02778952.8.
Translation of Japanese Office Action dated Mar. 25, 2008, Application No. 2003-504235.
European Office Action dated Apr. 22, 2008, EP02778952.8.
International Preliminary Report on Patentability dated May 15, 2006, PCT/US2004/038278 filed Nov. 15, 2004, (Publication No. WO2005/050381).
International Search Report, PCT/US2004/03827, dated Feb. 1, 2006.
International Preliminary Reporton Patentability, PCT/US2004/038278, dated May 15, 2006.
International Search Report and Preliminary Report on Patentability dated May 4, 2001, PCT/US2000/019363.
International Search Report dated Dec. 21, 2000, PCT/US2000/019324.
International Search Reporton Patentability dated Dec. 21, 2000 in PCT/US00/19364 filed Nov. 14, 2000 (Publication No. WO01/04756).
International Search Report dated Dec. 21, 2000, PCT/US2000/019329.

* cited by examiner

SYSTEM AND METHOD FOR SHARING SAN STORAGE

RELATED APPLICATIONS

Any and all applications for which a foreign or domestic priority claim is identified in the Application Data Sheet, or any correction thereto, are hereby incorporated by reference into this application under 37 CFR 1.57.

BACKGROUND OF THE INVENTION

Field of the Invention

The present invention generally relates to data storage, and more particularly, some embodiments relate to Storage Area Network (SAN) systems and methods.

Description of the Related Art

The storage and retrieval of data is an age-old art that has evolved as methods for processing and using data have evolved. In the early 18th century, Basile Bouchon is purported to have used a perforated paper loop to store patterns used for printing cloth. In the mechanical arts, similar technology in the form of punch cards and punch tape were used in the 18th century in textile mills to control mechanized looms. Two centuries later, early computers also used punch cards and paper punch tape to store data and to input programs.

However, punch cards were not the only storage mechanism available in the mid 20th century. Drum memory was widely used in the 1950s and 1960s with capacities approaching about 10 kb, and the first hard drive was developed in the 1950s and is reported to have used 50 24-inch discs to achieve a total capacity of almost 5 MB. These were large and costly systems and although punch cards were inconvenient, their lower cost contributed to their longevity as a viable alternative.

In 1980, the hard drive broke the 1 GB capacity mark with the introduction of the IBM 3380, which could store more than two gigabytes of data. The IBM 3380, however, was about as large as a refrigerator, weighed ¼ ton, and cost between approximately $97,000 to $142,000, depending on features selected. In contrast, contemporary storage systems now provide storage for hundreds of terabytes of data, or more, for seemingly instantaneous access by networked devices. Even handheld electronic devices such as digital cameras, MP3 players and others are capable of storing gigabytes of data, and modern desktop computers boast gigabytes or terabytes of storage capacity.

With the advent of networked computing, storage of electronic data has also expanded from the individual computer to network-accessible storage devices. These include, for example, optical libraries, Redundant Arrays of Inexpensive Disks (RAID), CD-ROM jukeboxes, drive pools and other mass storage technologies. These storage devices are accessible to and can be shared by individual computers using such traditional networks as Local Area Networks (LANs) and Wide Area Networks (WANs), or using Storage Area Networks (SANs). These client computers not only access their own local storage devices but also network storage devices to perform backups, transaction processing, file sharing, and other storage-related operations.

Network bandwidth is limited and can be overloaded by volumes of data stored and shared by networked devices. During operations such as system backups, transaction processing, file copying and transfer, and other similar operations, the network communication bandwidth often becomes the rate-limiting factor.

SANs, in particular, are networks designed to facilitate transport of data to and from network storage devices, while addressing the bandwidth issues caused by large volumes of data stored and shared on the network storage devices. Specifically, SANs are network architectures that comprise a network of storage devices that are generally not accessible by nodes on a traditional network (e.g., LAN or WAN). As such, a SAN implementation usually requires two networks. The first network is a traditional network, such as a LAN, designed to transport ordinary traffic between individual network computers (i.e., nodes). The second network is the SAN itself, which is accessible by individual computers through the SAN but not through the traditional network. Typically, once a SAN storage device (also referred to as a SAN storage node) is remotely attached to an individual computer over a SAN, it appears and functions much like a locally attached storage device (as opposed to appearing and functioning as a network drive).

By utilizing a SAN as a separate network for storage devices that perform bandwidth-intensive operations (e.g., backups, transaction processing, and the like), the SAN storage devices realize improved bandwidth among themselves and with traditional computers attached to the SAN. Additionally, when storage devices and traditional nodes communicate over the SAN, more bandwidth-intensive operations are performed over the SAN rather than a LAN, leaving the LAN to handle only the ordinary data traffic.

FIG. 1 illustrates an example of a traditional SAN implementation 10. There are multiple client nodes 15, 18, and 21 networked together using a LAN 1 which allows communication of ordinary data traffic between the nodes (15, 18, 21). Storage devices 12 are connected together through SAN 13, which provides high bandwidth network capacity for bandwidth-intensive data operations to and from the storage devices 12. As illustrated, client nodes 18 and 21 are also connected to SAN 13, allowing them high bandwidth data access to the storage devices 12. As discussed above, by utilizing the SAN to perform high bandwidth data access, the client nodes are not only moving bandwidth-intensive data operations from the LAN 19 to the SAN 13, but also accessing the data at higher data rates than are typically available on a traditional network such as LAN. Typically, SANs utilize high bandwidth network technologies, such as Fiber Channel (FC), InfiniBand, Internet Small Computer System Interface (iSCSI), HyperSCSI, and Serial Attached SCSI (SAS), which are not commonly utilized in traditional networks such as LANs.

SUMMARY OF THE INVENTION

Various embodiments of the invention relate to shared access to Storage Area Networks (SAN) storage devices, such as disk arrays, tape libraries, or optical jukeboxes. Embodiments of the present invention allow for managed, shared access to SAN storage devices while ensuring that data to and from SAN storage devices traverses over the SAN, and not traditional networks such as LANs or WANs. Embodiments of the present invention can also provide traditional client nodes with dynamic/on-demand provisioning of storage on SAN storage devices, and with concurrent read/write access to SAN storage devices.

In one embodiment, a Storage Area Network (SAN) host is provided, comprising: a server component; a first host bus adapter configured to be connected to a SAN client over a first SAN; a second host bus adapter configured to be connected to a SAN storage device over a second SAN; and wherein the server component is configured to manage a data block on the SAN storage device, provide the SAN client with block access to the data block on the SAN storage device, receive a storage operation request from the SAN client through the first host bus adapter, and in response to the storage operation request, perform a storage operation on the data block, the storage operation being performed over the second SAN through the second host bus adapter. By providing the block access to the SAN storage device, the SAN host can appear to the SAN client as a locally attached storage device. The SAN client may then access data made available from the SAN storage device by the SAN host as if the SAN client has direct disk access to the SAN storage device.

For some embodiments, the first host bus adapter is configured to provide the SAN client with block access to data on the SAN storage device through the first host bus adapter, while the second host bus adapter is configured to provide the SAN host with block access to data on the SAN storage device through the second host bus adapter.

In some embodiments, the first host bus adapter connects to the SAN client through the first host bus adapter using Fiber Channel (FC), InfiniBand, or Serial Attached SCSI (SAS). In additional embodiments, the second host bus adapter connects to the SAN storage device through the second host bus adapter using Fiber Channel (FC), InfiniBand, or Serial Attached SCSI (SAS). Additionally, in some embodiments, the first host bus adapter may be in target mode, so that the host bus adapter may operate as a server of data, while the second host bus adapter may be in initiator mode, so that the second host bus adapter may operate as a client of data.

In further embodiments, the server component is configured to manage shared access to one or more SAN storage devices. This shared access management may be performed by way of a data repository that the server component utilizes to track and maintain one or more SAN storage devices within a pool of storage resources. As this tracking and maintenance may involve managing blocks of data within the pool of storage resources, in the some embodiments the repository is utilized to manage the blocks of data on one or more SAN storage devices. Additionally, the server component may use the data repository to provision and determine allocation of storage space within the pool to a client node. Further, the server component may be configured to perform dynamic/on-demand provisioning of storage space on the SAN storage device for the SAN client as requested.

In some embodiments, the SAN storage device comprises a plurality of SAN storage devices managed by the server component as a pool of storage resources. In some such embodiments, the server component is further configured to add a new SAN storage device to the pool when the new SAN storage device is added to the second SAN.

In further embodiments, the server component may be further configured to perform data de-duplication on the SAN storage device while performing a storage operation.

By managing shared access, the server component is able to operate as an arbitrator of storage operation requests it receives. As such, in some embodiments, the server component determine whether the storage operation request is performed as the storage operation, and when the storage operation request is performed as the storage operation. This determination, for example, may be performed based on one or more settings and parameters stored on the SAN host system. Depending on the embodiment, the settings and parameters may be stored in and retrieved from a data repository accessible to the server component.

Additionally, the server component may configured to provide a plurality of SAN clients with concurrent access to the SAN storage. As such, the server component may be configured to arbitrate between a plurality of storage operation requests when they are received, either from a single SAN client or from multiple SAN clients.

Depending on the embodiment, the first storage operation or the second storage operation may be a file read, a file write, a file create, or a file delete operation. Depending on the embodiment, the first storage operation may be a discovery request to the system.

In additional embodiments, a Storage Area Network (SAN) client is provided, comprising: a client component; a host bus adapter configured to be connected to a SAN host over a first SAN; wherein the client component is configured to receive from the SAN client a request to perform a first storage operation on a SAN storage device, translate the first storage operation to a SAN host storage operation request, and send the SAN host storage operation request to the SAN host over the first SAN, the SAN host being configured to receive the storage operation request, and in response to the storage operation request, perform a second storage operation on the SAN storage device over a second SAN. The host bus adapter of the SAN client may be set to initiator mode. In some such embodiments, the client component receives the request to perform first storage operation through an application program interface (API) function call.

In some embodiments, a method for a Storage Area Network (SAN) host is provided, comprising: receiving from a SAN client a request to perform a first storage operation on a SAN storage device, wherein the request is received over a first SAN through a first host bus adapter; and in response to the request, performing a second storage operation on the SAN storage device, wherein the second storage operation is performed over a second SAN through a second host bus adapter. In some such embodiments, the method further comprises: arbitrating between a plurality of storage operation requests. In additional such embodiments, the method further comprises: detecting a new SAN device on the second SAN; and adding the new SAN storage to a pool of storage resources. In other such embodiments, the method further comprises: receiving a discovery request from the SAN client; and transmitting a discovery response to the SAN client, wherein the discovery response represents the SAN host as a traditional SAN storage device.

In yet further embodiments, a Storage Area Network (SAN) system is provided, the system comprising a SAN host in accordance with an embodiment of the present invention, and a SAN client in accordance with an embodiment of the present invention. Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following Figure. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
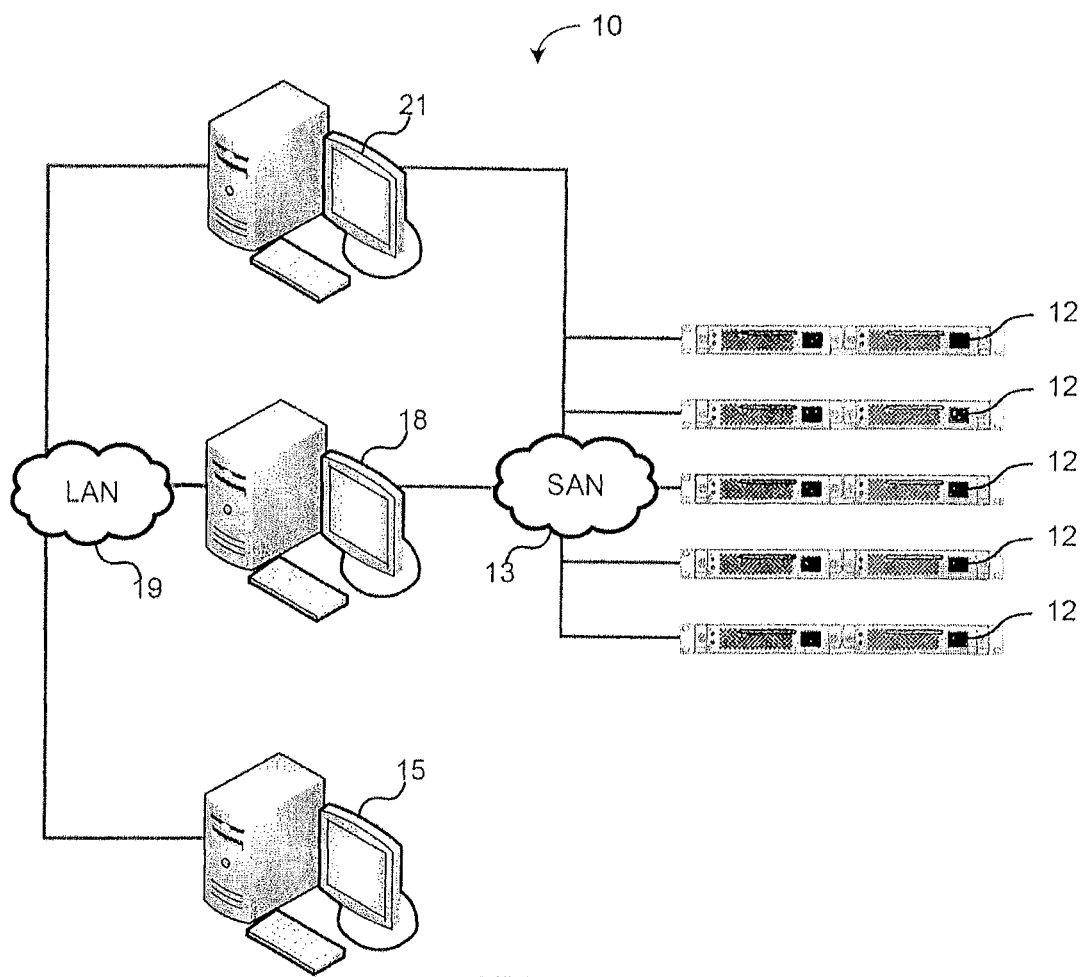
FIG. 1 is a diagram illustrating an example traditional Storage Area Network (SAN).

The Figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE PREFERRED EMBODIMENT

The present invention relates to Storage Area Networks (SANs) and, more particularly, shared access to Storage Area Network (SAN) storage devices. Particular embodiments of the present invention allow for managed, shared access to SAN storage devices. Some such embodiments ensure that data to and from SAN storage devices traverses over the SAN, and remains off traditional networks such as LANs or WANs. Further embodiments can provide traditional client nodes with dynamic/on-demand provisioning of storage on SAN storage devices, while providing concurrent read/write access to SAN storage devices.

Depending on the embodiment, the shared and concurrent access may comprise simultaneous access to the same block of data, the same file, the same SAN storage device, or the same allocation of located on SAN storage device or within a pool of SAN storage devices (i.e., storage resources). In some embodiments, the shared and concurrent access may be implemented by way of a queue that is maintained and controlled by the server component. In further embodiments, the concurrent access may be implemented by way priority framework, whereby a first SAN client having higher priority access than a second SAN client may preempt data access from that second SAN client, or preempt the second SAN position in a queue.

Before describing the invention in detail, it is useful to describe a few example environments with which the invention can be implemented. The systems and methods described herein can be implemented using a number of different storage architectures. One such exemplary storage architecture is described with reference to Figure Turning now to Figure the example storage operation cell 50 shown in FIG. 2 may performs storage operations on electronic data such as that in a computer network. As shown in this example, storage operation cell 50 may generally include a storage manager 100, a data agent 95, a media agent 105, and a storage device 115. The storage operation cell 50 may also include components such as a client 85, a data or information store 90, databases 110 and 111, jobs agent 120, an interface module 125, and a management agent 130. Each media agent 105 may control one or Input/Output (I/O) devices such as a Host Bus Adaptor (HBA) or other communications link for transferring data from client 85 to storage devices 115. Such a system and elements thereof are exemplary of a modular backup system such as the CommVault® QiNetix system, and also the CommVault GALAXY® backup system, available from CommVault Systems, Inc. of Oceanport, N.J., and further described in U.S. Pat. Nos. 7,035,880 and 7,620,710 each of which is incorporated herein by reference in its entirety.

A storage operation cell, such as cell 50, may generally include combinations of hardware and software components associated with performing storage operations on electronic data. Exemplary storage operation cells according to embodiments of the invention may include, CommCells as embodied in the QNet storage management system and the QiNetix storage management system by CommVault Systems of Oceanport, N.J. According to some embodiments of the invention, storage operation cell 50 may be related to backup cells and provide some or all of the functionality of backup cells as described in U.S. Pat. No. 7,395,282, which is also incorporated by reference in its entirety. It should be noted, however, that in certain embodiments, storage operation cells may perform additional types of storage operations and other types of storage management functions that are not generally offered by backup cells.

Figure 3:
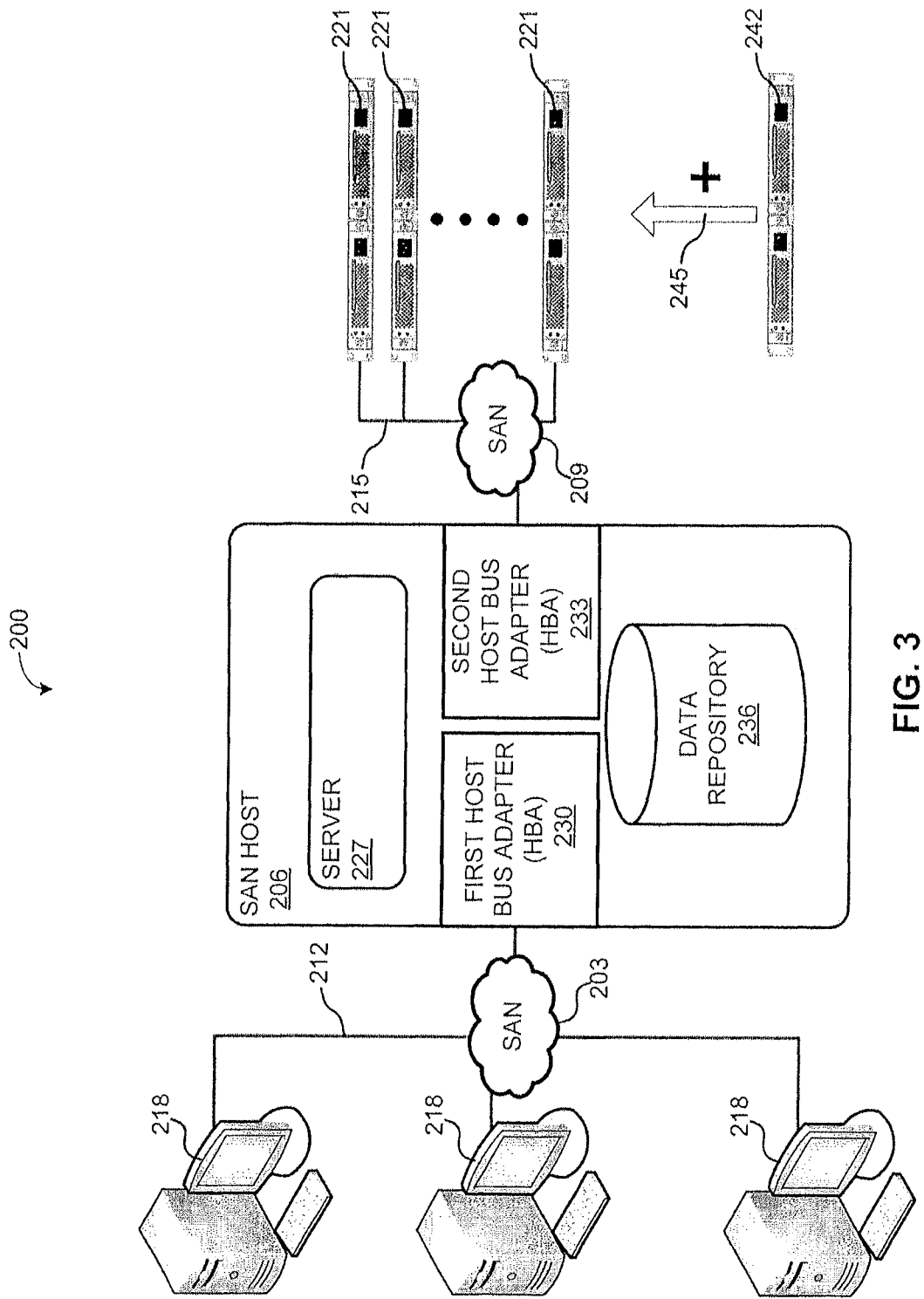
FIG. 3 is a diagram illustrating an example SAN in accordance with one embodiment of the present invention.

Turning now to FIG. 3, a diagram is provided illustrating an example SAN system 200 implemented in accordance with certain embodiments of the present invention. The illustrated system 200 includes a first SAN 203, a second SAN 209, and a SAN host 206. The first SAN 203, using SAN connections 212, connects SAN clients 218 together and connects the SAN clients 218 to the SAN host 206. A SAN client is any sort of computing device trying to access a SAN storage device. In the illustrated embodiment, the SAN clients 218 are desktop computers. Depending on embodiment, the SAN client 218 may be operating a media agent that controls one or more input/output (I/O) devices such as a host bus adapter (HBA) or other communication link for transferring data over SAN connections 212 on the first SAN 203. For example, the SAN client 218 may be connected to the first SAN 203 using a Fiber Channel HBA and a Fiber Channel connection. Using SAN connections 212, a SAN client 218 on the first SAN 203 may, for example, transfer data to and from a SAN storage device on the first SAN 203 or on another SAN (e.g., second SAN 209). For instance, the SAN client 218 may transfer data over the first SAN 203 and through the SAN connections 212, to the second SAN 209 via the illustrated SAN host 206.

It should be noted that references herein to data transfers should be understood to involve such storage operations as file creation, file deletion, file read, and file write. Additionally, one of ordinary skill in the art would understand and appreciate that data transfers described herein can be readily facilitated by other means of data operations in addition to just file operations (such as database operations).

Continuing with reference to FIG. 3, SAN host 206 is shown comprising a first host bus adapter (HBA) 230, which enables connections to SAN clients 218 through the first SAN 203, and a second host bus adapter (HBA) 233, which enables connections to SAN storage devices 221 via the second SAN 209. In the illustrated configuration, the first SAN 203 and the second SAN 209 are isolated from one another, thereby allowing the SAN host 206 to manage and control (e.g., arbitrate) shared access of the SAN storage devices 221 by the SAN clients 218. Both the first host bus adapter 230 and the second host bus adapter 233 could utilize different types of bus technologies to facilitate communication over their respective SANs. For example, either the first host bus adapter 230 or the second host bus adapter 233 may utilize such network technologies as Fiber Channel (FC), InfiniBand, Internet Small Computer System Interface (iSCSI), HyperSCSI, and Serial Attached SCSI (SAS). The first host bus adapter 230 or the second host bus adapter may simply be a traditional network interface, which allows such technologies as Internet Small Computer System Interface (iSCSI), Fiber Channel over Ethernet (FCoE), and ATA over Ethernet (AoE) to be utilized by SAN host 206 over the SANs.

As illustrated, the second SAN 209 connects SAN storage devices 221 together using SAN connections 215, and connects those SAN storage devices 221 to the SAN host 206. Similar to SAN clients 218, the SAN storage devices 221 may control one or more input/output (I/O) devices, such as HBAs or other communication links, that allow them to connect to the second SAN 209. The SAN storage devices 221 may use, for example, Fiber Channel HBA to connect to the second SAN 209. Using a SAN connection 215, a SAN storage device 221 may, for example, transfer data to and from a SAN client on the second SAN 209 or on another SAN (e.g., first SAN 203). For instance, the SAN storage device 218 may transfer data over the second SAN 209 to the second SAN 209 via the illustrated SAN host 206.

In some embodiments, the SAN host 206 operates as a conduit through which SAN clients 218, which may or may not be connected to a traditional network (e.g., LAN), can share access to one or more SAN storage devices 221 on a second SAN 209 over a first SAN 203. By doing so, such embodiments not only provide the SAN clients 218 shared data access to the SAN storage devices, but also provide such shared access without having to utilize a traditional network (e.g., LAN or WAN) or having the data leave a SAN. In effect, this allows sharing of bandwidth-intensive data to remain on the SAN without burdening the SAN clients traditional network (e.g., LAN or WAN).

The SAN host 206 may also function as a manager of storage operations, managing the blocks of data on one or more SAN storage devices. As manager, the SAN host 206 may also manage what storage operations are to be performed on SAN storage devices in response to a storage operation request from a SAN client. For example, SAN host 206 may include components that allow it to determine whether a storage operation should be performed on the SAN storage devices, and when a storage operation should be performed on the SAN storage devices. This management functionality may be utilized when, for example, two or more SAN clients are sharing access to a shared SAN storage device, and the SAN clients request concurrent access to the shared SAN storage device or pool, concurrent access to the same data on the shared SAN storage device, or concurrent access to the same allocation of storage space on the shared SAN storage. In further examples, this concurrent access may be to a pool of SAN storage devices rather than just a single SAN storage device. As such, the SAN host 206 may allow for concurrent shared access to one or more SAN storages devices while preventing deadlocks.

The management functionality of the SAN host 206 may also allow arbitration of two or multiple storage operation requests that arrive at relatively the same time, deciding which storage operation should be performed first, for example, based on such parameters as priority of the storage operation request.

Additionally, as part of data management functionality, the SAN host 206 may function to track and maintain one or more SAN storage devices as a pool of (SAN) storage resources (i.e., storage pool). In doing so, SAN host 206 may be allowed to, for example, dynamically provision (i.e., allocate) storage space from the pool for a given SAN client. For example, if the SAN host 206 were managing a pool of SAN storage resources totaling 5 TB in free space, and three SAN clients request 1 TB each of storage space, rather than statically reserving 1 TB of space within the pool to each of the SAN clients, the SAN host 206 can make a dynamic allocation of 1 TB to each of the SAN clients. In doing so, the SAN host is capable of growing a SAN client's storage space allocation as requested (i.e., on-demand).

Further, by managing the SAN storage devices as a pool of SAN storage resources, the SAN host 206 can readily manage the addition of new SAN storage devices to the pool, thereby allowing the pool to grow dynamically. Specifically, the storage pool may allow the SAN host 206 to dynamically add or remove one or more SAN storage devices (e.g., 221) from the pool, thereby increasing or decreasing the overall pool size, at times without the SAN clients even being made aware of such changes. It should be noted that, for some embodiments, the SAN host 206 is capable of managing and presenting dynamically allocated storage spaces as Logical Unit Numbers (LUNs).

In some embodiments, the dynamic (e.g., on-demand) provisioning (i.e., allocation) of storage space on the pool of SAN storage resources and the tracking and maintenance of the pool may be tied into the management function. For example, if a SAN client is writing to the shared pool of SAN storage resources and the pool reaches its capacity, the arbitrator could deny performance of the SAN client's storage write request.

In some embodiments, the SAN host 206 may manage the pool of SAN storage resources by way of a data repository (i.e., data store), which assists in the tracking and maintenance of the pool (e.g., tracking free storage space, tracking occupied storage space) and the allocation of storage space to SAN clients. In the illustrated embodiment, the tracking and maintenance of the pool of SAN storage resources (and, thus, the SAN storage devices 1) by the SAN host 206 is facilitated through data repository 236. Depending on the embodiment, the data repository 206 may be implemented as a data store, such as a database. Additionally, SAN host 206 may utilize the data repository 206 to manage data blocks within the storage pool. For example, management of data block may entail tracking ownership of data blocks to specific SAN clients, tracking storage of file data blocks that span multiple SAN storage devices (e.g., 221), tracking assignment of data blocks to specific allocated storage space, tracking occupied storage space within the storage pool, and tracking free storage space within the storage pool.

Through data repository 236, SAN host 206 can not only track dynamic provisioning and allocation of storage space within the storage pool to individual computing devices but, depending on the embodiment, can also dynamically add and remove SAN storage devices 1 from the storage pool. For example, when new SAN storage device is added to the second SAN 209, the SAN host 206 can add the new SAN storage device to the its storage pool. In some such embodiments, the SAN host 206 may perform the discovery and addition of the SAN storage device 242 to the pool automatically upon the addition of the SAN storage device 242 to the second SAN 209. For example, SAN host 206 may be configured to actively monitor the second SAN 209 for the addition of any new SAN storage devices, and add any such SAN storage device to the storage pool.

The SAN host 206 further comprises a server component 227. In some embodiments, the server component 227 is responsible for listening to and responding to storage operation requests it receives from the SAN clients 218. For example, the server component 227 may receive a file read, file write, file create, file delete storage operation request from a SAN client 218 and, in response, perform a corresponding storage operation on a SAN storage device 221 and may send a response back to the SAN client, depending on the storage operation request. According to embodiments that manage the SAN storage devices 221 as a pool of SAN storage resources, the corresponding storage operation may involve the server component 227 performing the storage operations on two or more SAN storage devices 221 within the storage pool. For example, the data blocks of a file involved in an operation may span three SAN storage devices 221 and, hence, in order to operate on the file, the SAN host 206 must perform a storage operation on those three SAN storage devices 221.

In some embodiments, the server component may also be configured to implement data de-duplication operations on the SAN storage devices 1, thereby increasing the over storage capacity of the SAN storage devices 1. For example, in particular embodiments, the data de-duplication may be implemented in the server component such that de-duplication is transparent to the SAN clients 218 jointly accessing the SAN storage devices 218. According to one embodiment, the deduplication may be facilitated through a hash table or other reference table that resides on the SAN host 206. The table references data that is shared amongst the SAN storage devices 221 managed by the SAN host 206. When the SAN host 206 is transferring data to the SAN storage devices 221, the SAN host 206 can use the table in a deduplication algorithm to determine if a data segment already exists on a SAN storage device 221. When it determines a copy already exists, the SAN host 206 may use the reference to an allocation of an existing copy of the data segment in place of the actual segment of data. Other de-duplication methodologies may be also employed by SAN host 206.

In some embodiments, when a client has data to transfer to or place in the shared storage, that client can run a deduplication algorithm on segments of the data and use its own representative instantiation of the reference table to determine whether the data segments already exist in a shared data store. Accordingly, for a given segment, the client can determine whether to send the entire data segment to the shared storage or just send a reference or pointer or other information from the reference table if the segment is duplicative of what is already in the data store. In a situation where the analyzed segment is not in the data store, the client device can send the hash value or other reference table information to the central storage (or other location maintaining the main reference table) so that the primary reference table can be updated with the information on the newly added segment.

Though not illustrated, the SAN clients 218 may comprise a client component that interfaces and interacts with the server component 227 of the SAN host 206 over the first SAN 203. For some embodiments, such a client component allows for seamless and transparent control of storage operations on the SAN storage devices 221 through the SAN host 206. For example, in some embodiments, the client component is able to receive file operation function calls through an application program interface (API), and then translate those function calls into storage operation requests for the SAN host 206 to perform. In this manner, the API encapsulates interactions between the client component and the server component, leaving the SAN client 218 unaware of the implementation of the SAN storage solution. Indeed, for some embodiments, the pool of SAN storage resources (e.g., SAN storage devices 221) appears as a traditional SAN storage device/resource. In this way, some embodiments of the present invention can readily integrate into existing SAN implementations with minimal to no change to the SAN implementation.

Figure 4:
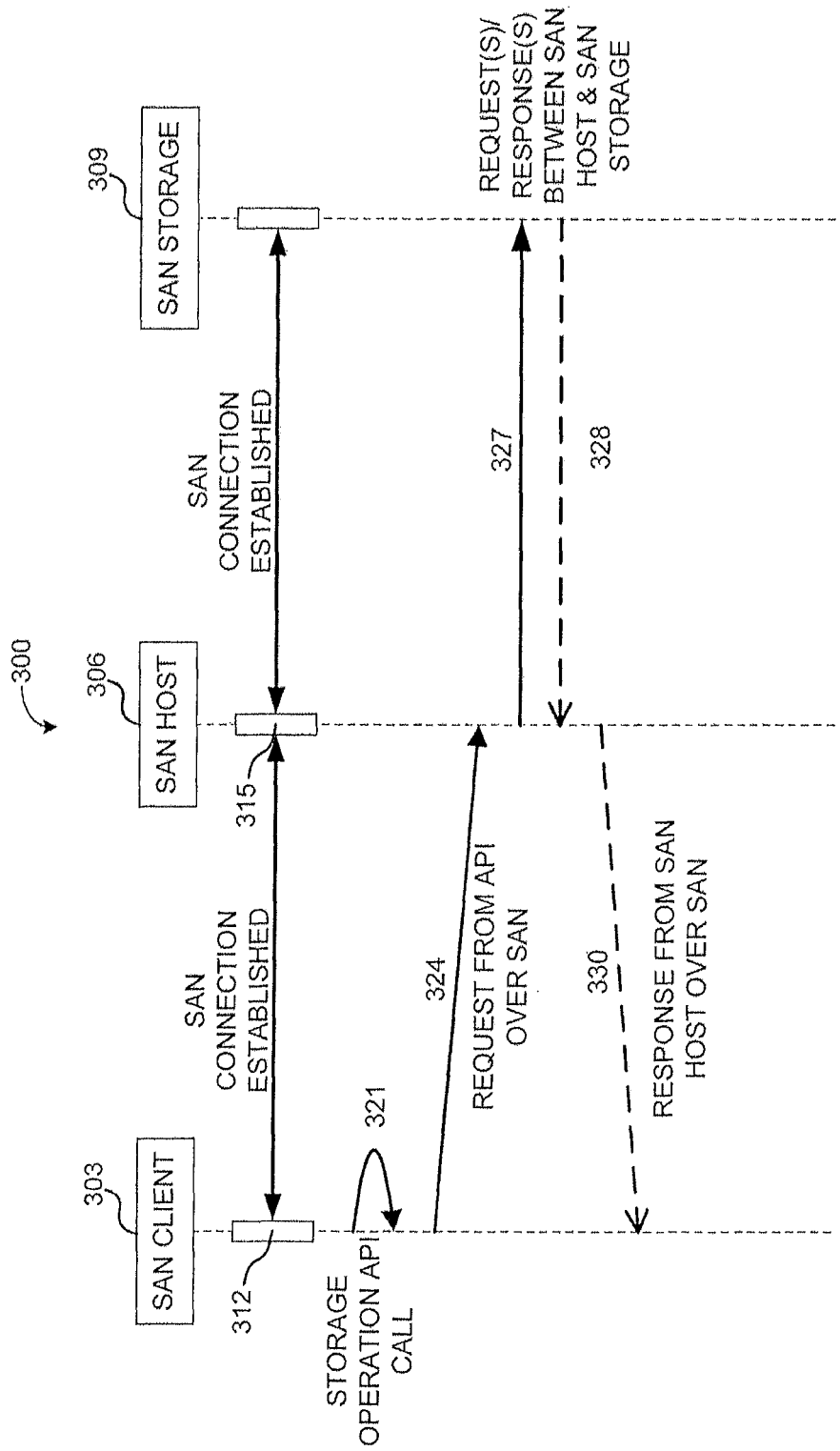
FIG. 4 is a diagram illustrating an example sequence of interactions between entities of a SAN in accordance with one embodiment of the present invention.

FIG. 4 provides an example sequence of interactions 300 between entities of a SAN in accordance with one embodiment of the present invention. Turning now to FIG. 4, the sequence begins with the establishment 312 of a Storage Area Network (SAN) connection between a SAN client 303 and a SAN host 306 over a first SAN, and the establishment 315 of a SAN connection between the SAN host 306 and a SAN storage device 309 over a second SAN. Once the connections are established, SAN client 303 performs a storage operation through an API function call. In some embodiments, the function call 321 instructs a client component residing on the SAN client 303 to transmit 324 to the SAN host 306 a storage operation request corresponding to the API function call 1. The client component thereby performs a storage operation request on behalf of the SAN client 303. Additionally, by instructing the client component through the API function call 32], the interactions between the SAN client 303 and SAN host 306 are encapsulated by the API. This eases integration of some embodiments into existing SANs.

Upon receiving the request from the SAN client 303, the SAN host 306 responds to the request, generally by sending one or more requests 327 to the SAN storage device 309 over a second SAN, which may invoke one or more responses 328 from the SAN storage device 309.

Subsequently, SAN host 306 may respond 330 to the SAN client 303 based on the response 328 from the SAN storage device 309 or the original request 324 from the SAN client. For example, where the SAN client 303 instructs its client component to perform a file read operation through an API, the client component would translate the instruction to a file read storage operation request, which is subsequently sent to the SAN host 306 (e.g., 321). The SAN host 306, in response to the file read storage operation request (e.g., 324), requests a file read operation from the SAN storage device 309 (e.g., 327), receives the file read data from the SAN storage device 309 (e.g., 328), and transmits that file read data back to the SAN client (330) in response to the original request (e.g., 324). In some embodiments, other storage operations, such as file writes, file creates, and file deletes, could have similar interaction flow.

Figure 2:
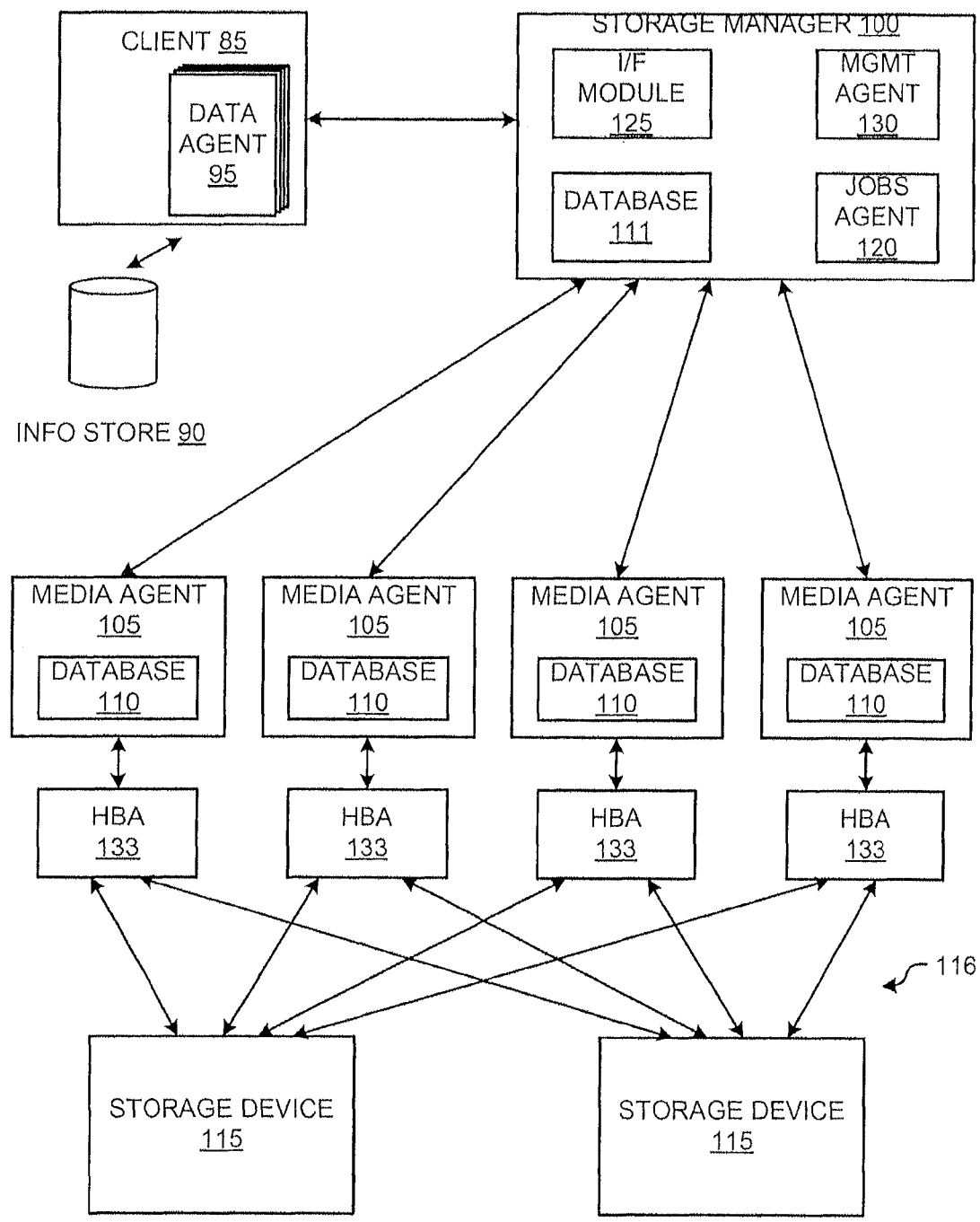
FIG. 2 is a diagram illustrating example of data storage algorithms and architectures that can be used in conjunction with the systems and methods in accordance with embodiments of the present invention.

Returning to Figure in some embodiments, the system 200 of FIG. 3 may be implemented into storage operation cell 50 of FIG. 2. For example, in one embodiment, system 200 could be implemented such that: the client 85 would operate as one of the SAN clients 218 of FIG. 3; the data agent 95 would operate as the client component that interfaces with SAN host 206 over a first SAN; the storage manager 100, media agents 105, and host bus adapters (HBAs) 133 would collectively operate as SAN host 206 of FIG. 3, where the storage manager 100 in conjunction with the media agents 105 would operate as the server component 227 of FIG. 3, and the HBAs 133 would operate as multiple second host bus adapters (233) of FIG. 3; and storage devices 115 would operate as the SAN storage devices communicating with the HBAs 133 over a second SAN.

Figure 5A:
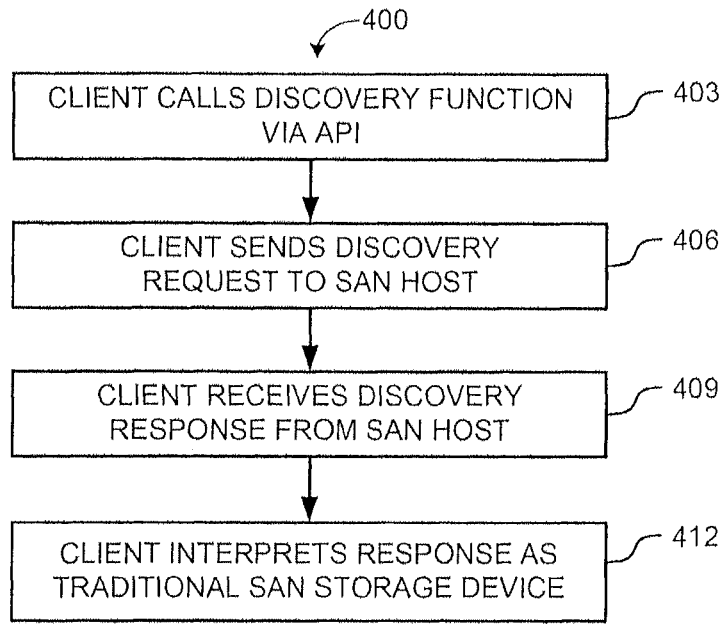
FIGS. 5A and 5B are flowcharts of example methods in accordance with embodiments of the present invention.
Figure 5B:
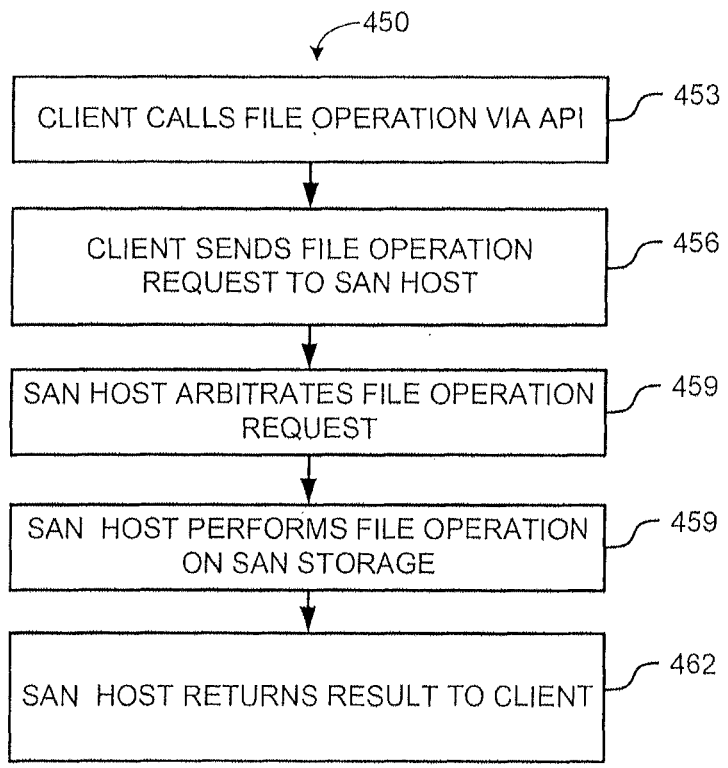

FIGS. 5A and 5B provides flowcharts of example methods in accordance with embodiments of the present invention. Specifically, FIG. 5A provides a flowchart of method 400 of storage discovery operation in accordance with an embodiment of the present invention, while FIG. 5B provides a flowchart of a method 450 for performing a general file storage operation in another embodiment of the present invention.

Turning now to FIG. 5A, method 400 begins as operation 403 with a SAN client 218, 303) performing a discovery function call through an API. This causes the SAN client to send a discovery request to a SAN host at operation 406. Depending on the embodiment, when the discovery function call is executed in operation 403, the API may instruct a client component residing on the SAN client to transmit a discovery request to the SAN host in operation 406.

The SAN host, upon receiving the discovery request, may send a discovery response back to the client at operation 409. Through the discovery response, the SAN host may, for example, inform the client of its storage features or capabilities (e.g., available storage space, total storage space, occupied storage space). Additionally, some embodiments may respond to the client such that the SAN host appears as a traditional SAN storage device. Alternatively, in embodiments such as method 400, the client may interpret the discovery response from the SAN host (at operation 409) to be one from a traditional SAN storage device.

In alternative embodiments, the client, upon discovering the existence of the SAN host and acquiring its SAN identifier (e.g., World Wide Name for a Fiber Channel SAN), can send a discover request to the host bus adapter of the SAN host. The SAN host, in response informs the client regarding aspects of its storage, such as free storage space and occupied space.

Turning now to FIG. 5B, method 450 for performing a general file operation in accordance with an embodiment is presented. Similar to method 400, method 450 begins as operation 453 with a SAN client (e.g., 218, 303) performing a file operation function call through an API, which causes the SAN client to send a file operation request to a SAN host at operation 456. In some embodiments, when the file operation function call is executed in operation 453, the API instructs a client component residing on the SAN client to transmit the file operation request to the SAN host in operation 456.

At operation 459, method 450 continues with the SAN host arbitrating if, when, and how the SAN host will perform the requested file operation. Based on the results of the operation 459, the method 450 may then send a response to the client at operation 462. For example, the client may be requesting a file write to the SAN storage device, but may have already exhausted its storage space allocation. As a result, the SAN host, functioning as arbitrator, may deny the client its file write request and, accordingly, send the client a file write denial (e.g., at operation 462). Other embodiments may involve additional data operations (e.g., file reads, file creation, file deletion).

Figure 6:
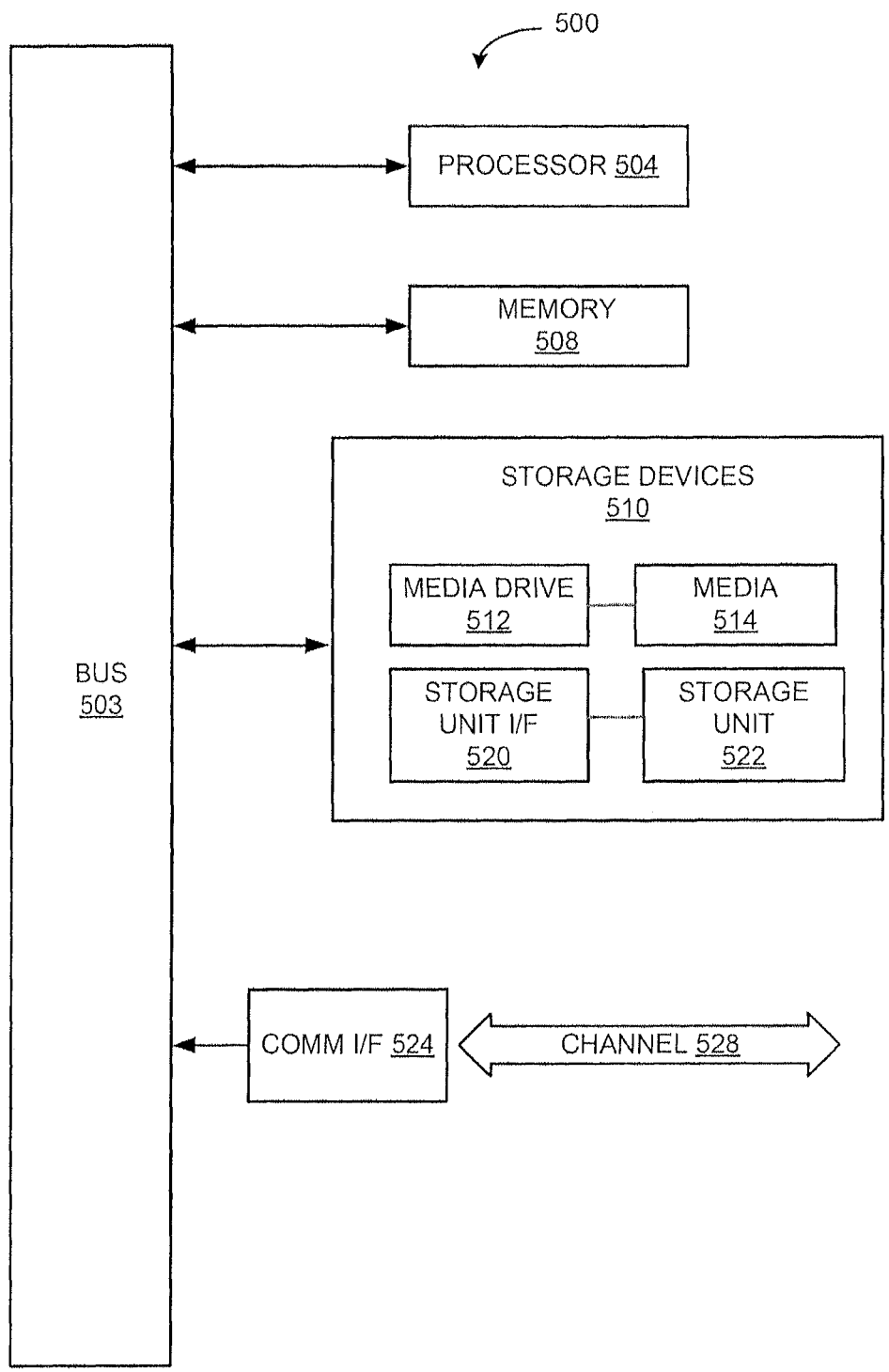
FIG. 6 is a diagram illustrating an example computing system with which aspects of the systems and methods described herein can be implemented in accordance with one embodiment of the present invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 6. Various embodiments are described in terms of this example-computing module 500. After reading this description, it will become apparent to a person skilled in the relevant art how to implement the invention using other computing modules or architectures.

Referring now to FIG. 6, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, W APs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the example illustrated in FIG. 6, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or R W), or other removable or fixed media drive might be provided. Accordingly, storage media 514, might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units and interfaces 520 that allow software and data to be transferred from the storage unit to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, Wi Media, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. These signals can deliver the software and data from memory or other storage medium in one computing system to memory or other storage medium in computing system 500. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 508, storage unit 520, and media 514. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A Storage Area Network (SAN) host, comprising:
a first storage client having higher priority access than a second storage client;
at least a first SAN and a second SAN;
one or more first SAN storage devices connected to the first SAN, wherein the one or more first SAN storage devices are not connected to the second SAN;
one or more second SAN storage devices connected to the second SAN, wherein the one or more second SAN storage devices are not connected to the first SAN; and
a SAN host server in communication with the first and second storage clients, the first SAN, and the second SAN, the SAN host server configured to:
maintain at least one shared storage pool that shares the one or more first SAN storage devices connected to the first SAN and the one or more second SAN storage devices connected to the second SAN;
maintain a priority queue associated with storage operations from the first and second storage clients; and
when the SAN host server receives storage operations from the first and second storage clients that seek concurrent access to the at least one shared storage pool, the SAN host server adjusts the priority queue to prioritize access to the at least one shared storage pool by the first storage client having the higher priority access.

2. The SAN host of claim 1, wherein the SAN host server is configured to preempt the second storage client from accessing the at least one shared storage pool.

3. The SAN host of claim 1, wherein the SAN host server is further configured to perform dynamic provisioning of storage space for the at least one shared storage pool using the first and second client storage devices.

4. The SAN host of claim 1, wherein the SAN host server is further configured to determine which storage operation associated with the first storage client is performed before other storage operations.

5. The SAN host of claim 1, wherein the SAN host server connects to the first SAN with a first host bus adapter using Fiber Channel (FC), InfiniBand, or Serial Attached SCSI (SAS).

6. The SAN host of claim 5, wherein the SAN host server connects to the second SAN with a second host bus adapter using Fiber Channel (FC), InfiniBand, or Serial Attached SCSI (SAS).

7. The SAN host of claim 6, wherein the first host bus adapter is in target mode.

8. The SAN host of claim 7, wherein the second host bus adapter is in initiator mode.

9. The SAN host of claim 1, wherein the SAN host server is further configured to perform data de-duplication while performing a storage operation.

10. The SAN host of claim 1, wherein the SAN host server is further configured to track storage of one or more data blocks on the one or more second SAN storage devices.

11. A method for a Storage Area Network (SAN) host server, comprising:
maintaining, with a SAN host server, at least one shared storage pool that shares one or more first SAN storage devices connected to a first SAN wherein the one or more first SAN storage devices are not connected to the second SAN, and one or more second SAN storage devices connected to a second SAN, wherein the one or more second SAN storage devices are not connected to the first SAN;
maintaining, with the SAN host server, a priority queue associated with storage operations from at least a first storage client and a second storage client, the first storage client having higher priority access than the second storage client; and
when the SAN host server receives storage operations from the first and second storage clients that seek concurrent access to the at least one shared storage pool, adjusting the priority queue to prioritize access to the at least one shared storage pool by the first storage client having the higher priority access.

12. The method of claim 11, further comprising preempting the second storage client from accessing the at least one shared storage pool.

13. The method of claim 11, further comprising dynamic provisioning storage space for the at least one shared storage pool using the first and second SAN storage devices.

14. The method of claim 11, further comprising determining which storage operation associated with the first storage client is performed before other storage operations.

15. The method of claim 11, further comprising connecting the SAN host server with the first SAN with a first host bus adapter using Fiber Channel (FC), InfiniBand, or Serial Attached SCSI (SAS).

16. The method of claim 15, further comprising connecting the SAN host server to the second SAN with a second host bus adapter using Fiber Channel (FC), InfiniBand, or Serial Attached SCSI (SAS).

17. The method of claim 16, wherein the first host bus adapter is in target mode.

18. The method of claim 16, wherein the second host bus adapter is in initiator mode.

19. The method of claim 11, further comprising performing data de-duplication while performing a storage operation.

20. The method of claim 11, further comprising tracking storage of one or more data blocks on the one or more second SAN storage devices.

* * * * *